United States Patent
Inoue

(10) Patent No.: US 11,780,759 B2
(45) Date of Patent: Oct. 10, 2023

(54) PROCESS OF PRODUCING GLASS VESSEL

(71) Applicant: NIPRO CORPORATION, Osaka (JP)

(72) Inventor: Yoshio Inoue, Osaka (JP)

(73) Assignee: NIPRO CORPORATION, Osaka (JP)

( * ) Notice: Subject to any disclaimer, the term of this patent is extended or adjusted under 35 U.S.C. 154(b) by 198 days.

(21) Appl. No.: 15/567,818

(22) PCT Filed: Apr. 21, 2016

(86) PCT No.: PCT/JP2016/062637
§ 371 (c)(1),
(2) Date: Oct. 19, 2017

(87) PCT Pub. No.: WO2016/171214
PCT Pub. Date: Oct. 27, 2016

(65) Prior Publication Data
US 2018/0134603 A1    May 17, 2018

(30) Foreign Application Priority Data
Apr. 24, 2015 (JP) .................. 2015-089619

(51) Int. Cl.
*C03B 29/02*      (2006.01)
*C03C 23/00*      (2006.01)
(Continued)

(52) U.S. Cl.
CPC ............ *C03B 29/02* (2013.01); *C03C 23/007* (2013.01); *A61J 1/065* (2013.01); *A61J 1/1468* (2015.05)

(58) Field of Classification Search
CPC ............................... C03B 29/02; C03C 23/007
See application file for complete search history.

(56) References Cited

U.S. PATENT DOCUMENTS

| 2,743,553 | A | * | 5/1956 | Armistead | .............. | C03C 27/02 |
| | | | | | | 501/15 |
| 6,230,520 | B1 | * | 5/2001 | Hirota | ..................... | C03B 11/08 |
| | | | | | | 65/102 |

(Continued)

FOREIGN PATENT DOCUMENTS

| JP | 2010-243091 | 10/2010 |
| JP | 2010-269973 | 12/2010 |
| WO | 2006/123621 | 11/2006 |

OTHER PUBLICATIONS

WO 2013/131720 machine translation, Risch et al. Mould, Process and Apparatus for Laser-assisted Glass Forming, Sep. 2013 (Year: 2013).*

(Continued)

*Primary Examiner* — Queenie S Dehghan
(74) *Attorney, Agent, or Firm* — WENDEROTH, LIND & PONACK, L.L.P.

(57) ABSTRACT

There is provided a means which carries out a fire-blast treating effectively upon removing a deteriorated region caused by processing in a process of producing a glass vessel. In a process of producing a glass vessel by fire-blast treating an internal surface 10 of a preform of the glass vessel with a flame from a burner 30 so as to produce the glass vessel, said fire-blast treating is carried out such that a temperature of an outer surface portion of the preform which portion is opposed to the deteriorated region caused by processing is between 650° C. and 800° C. when the flame is scanned along the internal surface of the preform toward an opening of the preform.

7 Claims, 3 Drawing Sheets

(51) Int. Cl.
  *A61J 1/14*      (2023.01)
  *A61J 1/06*      (2006.01)

(56) References Cited

U.S. PATENT DOCUMENTS

| | | | | |
|---|---|---|---|---|
| 8,522,575 | B2* | 9/2013 | Wada | C03B 29/02 |
| | | | | 65/120 |
| 2006/0096319 | A1* | 5/2006 | Dalstra | G01J 5/0003 |
| | | | | 65/29.11 |
| 2009/0099000 | A1 | 4/2009 | Kuwabara et al. | |
| 2010/0255229 | A1 | 10/2010 | Wada | |
| 2014/0373574 | A1* | 12/2014 | Moseler | C03B 23/112 |
| | | | | 65/111 |
| 2015/0114043 | A1* | 4/2015 | Risch | C03B 23/043 |
| | | | | 65/29.18 |
| 2016/0016841 | A1* | 1/2016 | Frost | C03B 29/02 |
| | | | | 65/29.1 |
| 2018/0002224 | A1* | 1/2018 | Gaylo | C03B 23/114 |

OTHER PUBLICATIONS

International Search Report dated Jun. 21, 2016 in International (PCT) Application No. PCT/JP2016/062637.
International Preliminary Report on Patentability dated Nov. 2, 2017 in International (PCT) Application No. PCT/JP2016/062637.

* cited by examiner

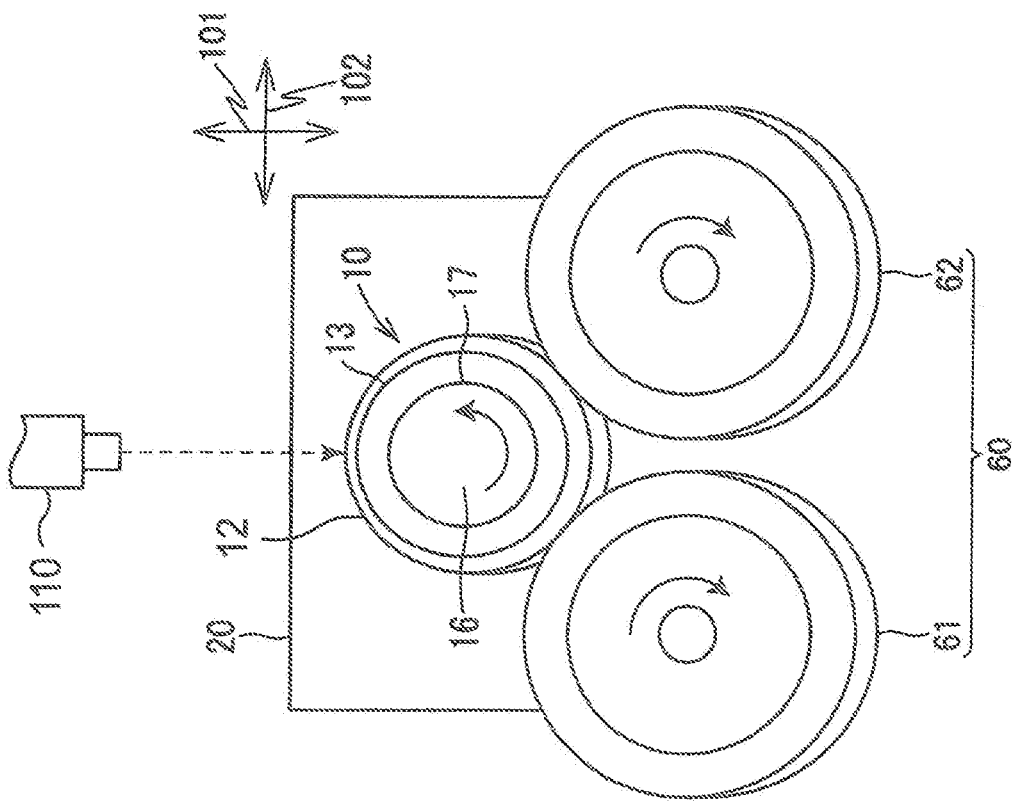
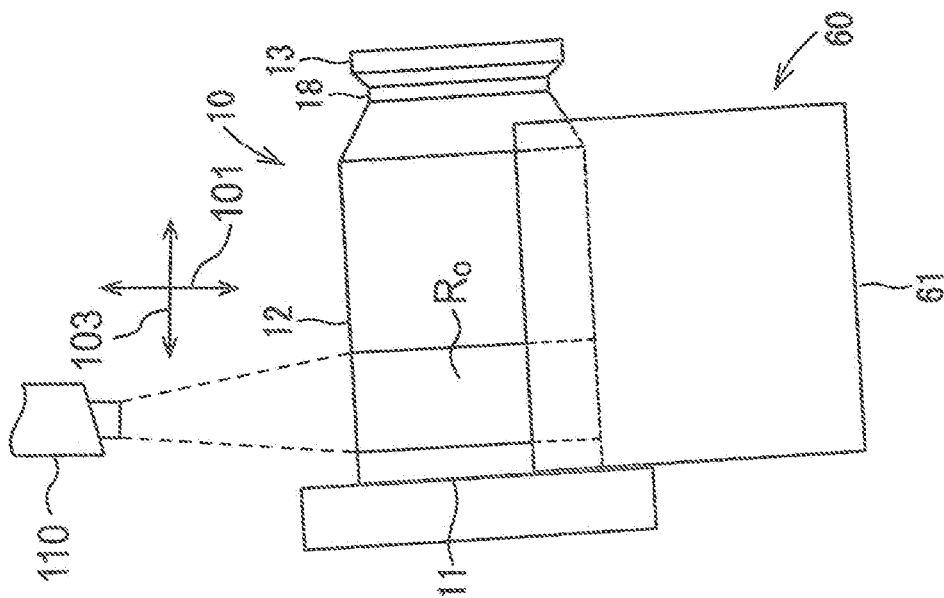

PROCESS OF PRODUCING GLASS VESSEL

FIELD OF INVENTION

The present invention relates to a process of producing a glass vessel, in particular a glass vessel having a bottom, and especially a glass vessel for medical use such as a vial.

BACKGROUND ART

A glass vessel, for example a vial for medical use is made of a borosilicate glass tube which has an excellent chemical resistance. By heating and forming the borosilicate glass tube, a mouth portion and a bottom portion of the vial are provided. When the borosilicate glass tube is heated so as to form the glass tube, alkali components contained in the glass tube are volatilized, which condense and attach onto an internal surface of the vial. A region of the surface where the alkali components are thus attaching is called as a deteriorated region caused by processing. Such alkali components of the deteriorated region caused by processing are possibly eluted into a liquid which is stored in the vial, so that the liquid is adversely affected. Then, ISO 4802-1 and 2 (Glassware: Hydrolytic resistance of the interior surface of glass containers for medical use) prescribe a standard of an elution amount of the alkali components from an internal surface of a glass vessel.

A method of suppressing alkali elution from an internal surface of a glass vessel is known wherein the internal surface of the glass vessel made of a borosilicate glass tube is fire-blast treated with an oxygen-gas flame of a point burner while rotating the glass vessel so as to remove the deteriorated region caused by processing (see Patent Literatures 1 and 2 referred to below).

PRIOR ART REFERENCES

Patent Literature

Patent Literature 1: International Publication No. WO2006/123621
Patent Literature 2: Japanese Patent Kokai Publication No. 2010-269973

SUMMARY OF INVENTION

Problem to be Solved by Invention

In the production process of a glass vessel, it is important that the fire-blast treating is effectively carried out upon the removal of the deteriorated region caused by processing. The problem to be solved by the invention is therefore to provide a means which effectively carries out the fire-blast treating.

Means to Solve Problem

In the production process of a glass vessel, when an amount of alkali elution from an internal surface of the glass vessel produced is reduced by means of removing a deteriorated region caused by processing with fire-blast treating the internal surface of a preform of the glass vessel, it has been found according to the studies of the inventor that the fire-blast treating is appropriately carried out if a temperature of an external surface of the preform which surface corresponds to the deteriorated region is between 650° C. and 800° C.

The present invention therefore provides a process of producing a glass vessel by fire-blast treating an internal surface of a preform of the glass vessel with a flame from a burner so as to produce the glass vessel, and it is characterized in this process in that said fire-blast treating is carried out such that a temperature of an external surface portion of the preform which portion is opposed to a deteriorated region of the preform caused by processing is between 650° C. and 800° C. when the flame is scanned along the internal surface of the preform toward an opening of the preform.

In other words, the above mentioned present invention resides in a process of fire-blast treating by applying the flame of the burner to the internal surface of the preform of the glass vessel in the production of the glass vessel, and such process of fire-blast treating is characterized in the temperature of the external surface portion which is opposed to the deteriorated region caused by processing is between 650° C. and 800° C.

In other aspect, the present invention also provides a process of producing a glass vessel which produces a glass vessel by fire-blast treating an internal surface of a preform of the glass vessel with a flame of a burner upon the production of the glass vessel, and it is characterized in that said fire-blast treating is carried out by scanning, with the flame toward an opening of the preform, an internal surface portion of the preform in a belt like region which is located at a height between 8% and 16% of a total height of the preform from a bottom of the preform based on an external dimension of the preform.

In other words, the above mentioned present invention resides in a process of fire-blast treating by applying the flame of the burner to the internal surface of the preform of the glass vessel in the production of the glass vessel, and such process of fire-blast treating is characterized in that said fire-blast treating is carried out by scanning, with the flame toward an opening of the preform, an internal surface portion of the preform in a belt like region which is located at a height between 8% and 16% of a total height of the preform from a bottom of the preform based on an external dimension of the preform.

In further other words, the above mentioned present invention provides a process of reducing an amount of alkali elution from a glass vessel by fire-blast treating the internal surface of the preform of the glass vessel, and such process of reducing the alkali elution is characterized in that the region of the preform where the fire-blast treating is carried out and/or the temperature of the external surface portion of the preform upon such fire-blast treating is limited to a specified range, and whereby an amount of alkali elution can be effectively reduced.

In the present description, the term "glass vessel" means a vessel which is in the condition after the fire-blast treating in the process according to the present invention while the term "preform of the glass vessel" means a vessel which is in the condition before the fire-blast treating so that the preform has a deteriorated region caused by processing on at least a portion of its internal surface.

Such preform of the glass vessel is made of a borosilicate glass tube by a conventional process (for example, a process in which a glass tube is heated so as to be softened for its forming while using a vertical forming machine), and may generally be a so-called bottom-having-vessel which has a closed bottom portion at its one end while having an open mouth portion at the other end. The glass vessel is prepared by fire-blast treating (which may also be referred to as FB treating) such a preform. In one embodiment, such a glass vessel or a preform as a precursor of the glass vessel is a container in the form of a circular cylinder as a whole having an axis (i.e. a form which has an axis and of which cross section perpendicular to the axis is of a circle), but it is not limited to a container having such a form. It may be of other form as required, and for example it may be a prismic cylinder (such as a rectangular cylinder or a triangle cylinder), and it may be of a form of which length along its axis is smaller than its diameter (for example, a lower circular cylinder form). It is noted that such a glass vessel or its preform may be in the form of a vial, an ampule, or the like in other embodiment, and an area of its cross section perpendicular to its axis may change along its axis. For example, it may include a constricted portion.

It is noted that the fire-blast treating is a treatment for the purpose of reducing an amount of alkali elution from a glass vessel in which a combustible gas such as a low hydrocarbon gas (for example, city gas, propane, butane, natural gas or the like) is burnt in the presence of oxygen gas so as to form a flame (which is rich in hydronium ion as a result of such burning), which is ejected through a burner toward a deteriorated region caused by processing whereby the alkali components attached onto the deteriorated region caused by processing is reduced or removed. In one embodiment, the flame is ejected through a point burner, and the flame is applied to the internal surface with being moved over the internal surface from a bottom of the preform (or a position shifted a little toward an opening side of the preform from the bottom) toward the opening of the preform while the preform is rotated around its axis, so that the internal surface of the preform is scanned.

Effects of Invention

According to the present invention, by fire-blast treating such that the temperature of the external surface portion of the preform which corresponds to the internal surface portion of the preform where the deteriorated region caused by processing is located becomes in the specified range as mentioned above and below, an amount of the alkali elution from the produced glass vessel is suppressed compared with a case where fire-blast treating is carried out outside the specified such temperature range, so that the specified range enhances the effect of the fire-blast treating. Also, by fire-blast treating the specified region of the internal surface of the preform as mentioned above and below, an amount of the alkali elution is sufficiently reduced, so that it is not necessarily required that the fire-blast treating is applied to a whole of the internal surface of the preform. For, example, the fire-blast treating may be a treatment of at least a portion of the internal surface depending on the application of the glass vessel, and it is not necessarily required that a whole of the internal surface is fire-blast treated. It is of course no problem that the fire-blast treating is applied to a whole of the internal surface of the preform, and in one embodiment, it may be applied at the bottom of the preform as well as from the periphery of the bottom toward the opening of the preform. In this embodiment, the application of the fire-blast treating to at least a portion or a whole of the bottom may be omitted.

In addition, by fire-blast treating such that the temperature of the external surface portion which is opposed to the specified internal surface of the preform as mentioned above and below becomes within the specified temperature range as mentioned above and below, the fire-blast treating is further effectively carried out.

BRIEF DESCRIPTION OF DRAWINGS

FIG. 3A and FIG. 3B schematically show an embodiment in the process of producing a glass vessel according to the present invention wherein, in a step of fire-blast treating, a preform is rotated by means of a pair of rollers while supporting the preform and a temperature of an external surface portion of the preform is measured upon thus being rotated.

EMBODIMENTS TO CARRY OUT INVENTION

Figure 1:
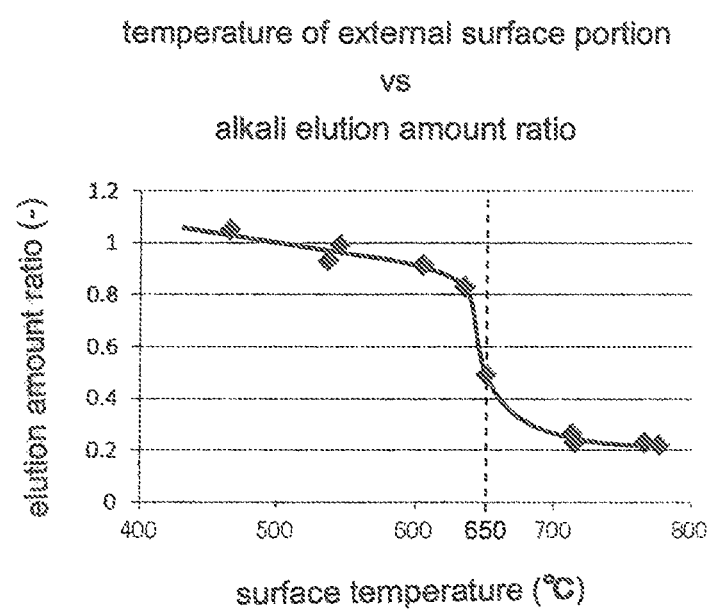
FIG. 1 shows a graph which indicates a relationship between a temperature of an external surface portion of a preform upon fire-blast treating and an alkali elution amount ratio.

The present invention will hereinafter be explained in detail with, as an example, a process of producing a glass vessel according to the present invention, but what is explained below is similarly applicable to the process of fire-blast treating, the process of reducing an amount of alkali elution from a glass vessel, and any other processes according to the present invention, which will be described below.

As described below, the present inventor has found it important that the temperature of "an external surface portion of the preform which portion is opposed to the deteriorated region caused by processing" is for example between 650° C. and 800° C. or in various temperature ranges (as specific temperature ranges) which will be described below. Based on this, in one embodiment of the process of producing a glass vessel according to the present invention, the temperature of the external surface portion of the preform which is opposed to the deteriorated region, and in particular to the internal surface portion which has the deteriorated region is measured during, the production of the glass vessel, and it is determined whether thus measured temperature is in the specific range temperature range, for example, in the range between 650° C. and 800° C. or not. When the measured temperature is within the specific range, it means that the fire-blast treating proceeds appropriately as predetermined. It is therefore confirmed that the glass vessel after the fire-blast treating shows an amount of the alkali elution as predetermined. On the other hand, since the measured temperature outside the specific range means that the fire-blasé treating is not being carried out as predetermined, conditions of the fire-blast treating (for example, operation conditions of the burner such as a flow rate of the gas, a time of the fire-blast treating and the like) are changed so that the measured temperature can be within the specific range. It is possible that an amount of the alkali elution of the glass vessels produced when the measured temperature is outside the specific range exceeds the predetermined amount, so that they are regarded to be defective products in situ and may be optionally disposed. In this embodiment, the judgment whether the fire-blast treating is being appropriately carried out or not is done online. That is, the judgment is done during or just after the fire-blast treating.

In one embodiment, the process according to the present invention is a process of producing a glass vessel by fire-blast treating an internal surface of a preform of the glass vessel with a flame from a burner which process is characterized in that, upon the fire-blast treating while scanning the internal surface of the preform toward its opening with the flame, a temperature of an outer surface portion of the preform which portion is opposed to a deteriorated region of the preform caused by processing is measured, and when thus measured temperature is outside a range between 650° C. and 800° C., the produced glass vessel is regarded a defective product, and such product is segregated from the glass vessels which have been produced when the measured temperature is within the range between 650° C. and 800° C. With a device which picks up and conveys a glass vessel, such segregation may be carried out by disposing the defective glass vessel or preparing for such disposal (for example, storing the defective glass vessels in a container for the purpose of disposal). It is noted that the temperature range between 650° C. and 800° C. may be, in a preferable embodiment, in the other temperature ranges as described below (for example, a range between 670° C. and 780° C., a range between 700° C. and 770° C. or the like).

In other embodiment, a temperature of an outer surface portion of the preform which portion is opposed to a deteriorated region of the preform caused by processing is measured during the production of the glass vessel, and after obtaining the glass vessel with the fire-blast treating, that is, after the completion of the production of the glass vessels, measured temperature results of the external surface portion of the preform are compared with the specific temperature range, and it is judged whether the fire-blast treating applied to the produced glass vessels were appropriate or not. The measured temperatures within the specific range means that the fire-blast treating has been done appropriately, so that it is confirmed that the glass vessels which have been produced when such temperatures has been measured show an amount of the alkali elution as predetermined. On the other hand, the measured temperatures which are outside the specific temperature range means that the fire-blast has not been carried out appropriately, so that the glass vessels which have been produced when such temperatures has been measured show an amount of the alkali elution may exceed the predetermined amount. Such glass vessels are regarded to be defective products and optionally disposed. In this embodiment, whether the fire-blast treating has been done appropriately is judged offline, and it is judged after the glass vessel having been fire-blast treated.

In the present invention, a phrase "an external surface portion (i.e. a portion of an external surface) of the preform which portion is opposed to the deteriorated region caused by processing" means an outer wall portion (i.e. a portion of an outer wall) which is opposed, through a thickness portion of the preform, to an inner wall portion (i.e. a portion of an inner wall) of the preform which portion defines said thickness portion of the preform as an internal surface portion (i.e. a portion of an internal surface) of the preform on which portion the deteriorated region caused by processing is located. In other words, a portion of a side surface of the preform has the inner surface portion as a portion of the inner wall and the outer surface portion as a portion of the outer wall which portions define said portion of the side surface, and those portions of the inner wall are opposed to each other so as to form said portion of the side surface which has thus described thickness portion.

Also, the present inventor has confirmed the location of the deteriorated region caused by processing which region is present on the internal surface of the preform. The preform used in the process of the present invention was prepared with a conventional vertically forming machine by heating a glass tube made of a borosilicate which is rotated while vertically supported to form a mouth portion followed by forming a bottom portion. The area of the deteriorated region caused by processing on the internal surface of thus formed preform of the production of the vial was located. For such location, the following method was applied:

(1) With regard to various preforms, using a microscope (magnification: 200 to 1000 times), the area where the alkali component deposition is on the internal surface (in the form of a crater like or a circular hill like pattern) was visually observed. With the microscope, a photo of an enlarged internal surface was obtained, and counted the number of the alkali depositions along a height of the preform from its bottom toward its opening, and it has been found that the number increases rapidly after a certain height (H1), and then decreases rapidly after a certain height (H2).

(2) In addition, the preforms were filled with 0.05% methylene blue solution and left to stand for 20 minutes, followed by being washed with distilled water and dried at a temperature of 120° C. for 10 minutes. As a result of this, methylene blue was adsorbed to the deteriorated region caused by processing, so that a colored belt like region appeared on the internal surface of the preform. The locations (starting location H1 and ending location H2 of the belt like region) from the bottom of the vial were measured. As a result of measuring the locations as to the various preforms, it has been found that the deteriorated region caused by processing is present in the form of a belt like region having a certain width with starting from a certain height from the bottom toward an opening of the preform. The measured results are shown in Table 1 as follows:

TABLE 1

| | dimensions of preform | | | | deteriorated region caused by processing | | | |
| | | | | | height from bottom (mm) | | height from bottom (% based on total length) | |
| Experiment No. | barrel diameter mm | wall thickness mm | total length mm | volume ml | H1 mm | H2 mm | H1 % | H2 % |
|---|---|---|---|---|---|---|---|---|
| 1 | 16 | 1 | 33 | 2.5 | 3.5 | 5.5 | 10.6 | 16.7 |
| 2 | 18 | 1 | 33 | 3 | 2.5 | 6.5 | 7.6 | 19.7 |
| 3 | 22 | 1 | 40 | 5 | 3 | 5.5 | 7.5 | 13.8 |
| 4 | 24.3 | 1.2 | 46.5 | 10 | 4 | 8 | 8.6 | 17.2 |
| 5 | 23 | 1.2 | 35 | 5 | 3.5 | 11 | 10.0 | 31.4 |
| 6 | 15 | 1 | 40 | 3 | 2.5 | 6 | 6.3 | 15.0 |
| 7 | 18 | 1 | 40 | 3 | 1.8 | 7.5 | 4.5 | 18.8 |
| 8 | 21 | 1.2 | 50 | 10 | 2.5 | 8 | 5.0 | 16.0 |

In Table, the terms mean as follows:

barrel diameter: outer diameter of largest portion (based on external dimension of preform)

total length: total length along axis of preform (based on external dimension of preform)

H1: belt like region starting height from bottom (based on external dimension of preform)

H2: belt like region ending height from bottom (based on external dimension of preform)

It is noted that H1 and H2 are figures obtained by the above mentioned method (2), and they are substantially the same as those obtained by the above mentioned method (1).

As clearly seen from Table 1, it has been found that regardless of the kind of the vials, a considerably large ratio of the deteriorated region caused by processing is present in the belt like region from 8% to 16% in height from the bottom of the preform, a larger ratio of the deteriorated region caused by the processing is present in the belt like region from 6% to 20% in height from the bottom of the preform, and most of the deteriorated region caused by processing is present in the belt like region from 5% to 30% in height from the bottom of the preform.

In order to reduce the deteriorated region caused by processing, with only fire-blast treating an internal surface portion which is a belt like region present in height from 8 to 16%, preferably 6 to 8% and more preferably 5 to 30% of the total length of the preform based on the external dimension of the preform, an amount of alkali elution is effectively reduced. In other words, in order to effectively reduce the amount of alkali elution, the internal surface of the preform which is of the belt like form and which is located at least from 8 to 16% preferably 6 to 8% and more preferably 5 to 30% of the total length of the preform in height from the bottom of the preform is fire-blast treated. In one embodiment of the process of the present invention, it is possible to fire-blast treat only the above mentioned specific belt like region, and in other embodiment, it is also possible to fire-blast treat a broader area which includes the above specific belt like region. It is noted that there is substantially no correlation between the location of the deteriorated region and the thickness of the preform, but the belt like region located in the above described regions is preferably used for the production of the vial having a thickness between 0.8 mm to 2.0 mm, for example between 0.9 mm and 1.5 mm, and especially between 1.0 mm and 1.2 mm.

It is necessary that the temperature of the external surface portion of the preform which is opposed to the internal surface portion having thereon the deteriorated region caused by processing is within the above described rage for example in the range between 650° C. and 800° C. In the present invention, the external surface portion of the preform which is opposed to the internal surface portion where the fire-blast treating is carried out corresponds to an area which is located just outside the internal surface portion of the preform where the deteriorated region caused by processing as readily understood based on its above described definition and the above described belt like regions experimentally confirmed.

It is contemplated that in the fire-blast treating, the alkali components of the deteriorated region caused by processing are chipped off by ions and particles contained in the flame from the burner, so that it is preferable that the flame contains more amount of the ions and particles. It is presumed that such ions and particles are generated as a result of a combustion reaction between a low hydrocarbon and oxygen.

A combustion temperature is important for such reaction, and it is contemplated that a temperature of the flame injected from a burner is important. Heat of the flame is transferred to the external surface portion of the preform which portion is located outside the internal surface portion to which the flame is applied, so that such heat affects the temperature of the external surface portion. Then, after measuring various relationships between the temperature of the external surface portion of the preform upon the fire-blast treating and an amount of the alkali elution of the preform after fire-blast treating, that is, the glass vessel, it has been found that the temperature of the external surface portion of the preform upon the fire-blast treating affects the amount of the alkali elution.

Using the preform of the above described Experiment No. 4, the fire-blast treating (FB treating) was carried out such that an end of the flame touches an internal surface portion which corresponds to a position at a height of 6 mm from the bottom of the preform based on its outside shape of the preform. The fire-blast treating was carried out using city gas and oxygen. With changing conditions of the fire-blast treating variously, a temperature of the external surface portion at a height of 6 mm from the bottom of the preform and an amount of the alkali elution of the produced glass vessel was measured. The results are shown in the following Table 2 together with a city gas amount used for the burner and a fire-blasting (FB) term.

TABLE 2

| Experiment | city gas amount L/min | FB term sec | external surface temperature ° C. | alkali elution amount PPM | ratio of alkali elution amount to alkali elution amount of Experiment 10 (—) |
|---|---|---|---|---|---|
| 10 | — | — | — | 1.05 | 1.00 |
| 11 | 0.58 | 6 | 466 | 1.10 | 1.05 |
| 12 | 0.58 | 9.5 | 546 | 1.04 | 0.99 |
| 13 | 0.58 | 13 | 605 | 0.96 | 0.91 |
| 14 | 0.58 | 16.5 | 651 | 0.52 | 0.49 |
| 15 | 0.58 | 20 | 715 | 0.24 | 0.23 |
| 16 | 0.7 | 6 | 537 | 0.98 | 0.93 |
| 17 | 0.7 | 9.5 | 635 | 0.87 | 0.83 |
| 18 | 0.7 | 13 | 713 | 0.27 | 0.26 |
| 19 | 0.7 | 16.5 | 766 | 0.24 | 0.23 |
| 20 | 0.7 | 20 | 777 | 0.23 | 0.22 |

The measurement of the amount of the alkali elution was carried out by filling each vial with distilled water, heating such vial at a temperature of 121° C. for 60 minutes followed by cooling and then measuring an amount of sodium contained the distilled water filled in each vial. The measurement of sodium was done by atomic absorption according to ISO4802-1 and 2. The results are shown in FIG. 1 as a graph.

It is seen from the graph that the amount of the alkali elution from the glass vessel drastically decreases when the temperature of the external surface portion of the preform exceeds 620° C. In one embodiment, the temperature of the external surface portion which corresponds to the deteriorated region caused by processing is therefore at least 620° C. when the fire-blast treating is carried out.

Those skilled in the art can appropriately selects the temperature of the above described external surface portion upon the fire-blast treating depending on a desired amount of the alkali elution while using the graph of FIG. 1. For example, when an amount of the alkali elution is to be not larger than a half of that without a fire-blast treating, it is preferable that a flame is applied to the deteriorated region caused by processing such that the temperature of the above described external surface portion is at least 650° C. It is noted that it is possible that the shape, the volume and so on of the preform may be changed if the preform is heated such that the borosilicate glass is softened. The temperature of the external surface portion is preferably not exceeding considerably a softening point of the borosilicate glass, more preferably not exceeding a softening point of the borosilicate glass, and particularly not higher than 800° C., for example not higher than 780° C.

In the process according to the present invention, it is therefore preferable that the flame is applied to the deteriorated region caused by processing on the internal surface portion of the preform such that the above described temperature of the external surface portion is in the range between 650° C. and 800° C., and it is more preferably the flame is applied to the deteriorated region caused by processing on the internal surface portion of the preform such that the above described temperature of the external surface portion is in the range between 670° C. and 780° C. For example, the flame is applied such that the temperature of the external surface portion is in the range between 700° C. and 770° C. Such fire-blast treating to make the temperature of the external surface portion within the specific temperature range is preferable for the production of a vial of which volume is 1 to 100 ml and for example 1 to 30 ml, and also preferable for the production of a vial of which thickness is 0.8 to 2.0 mm, for example 0.9 to 1.5 mm, and especially 1.0 to 1.2 mm.

Figure 2:
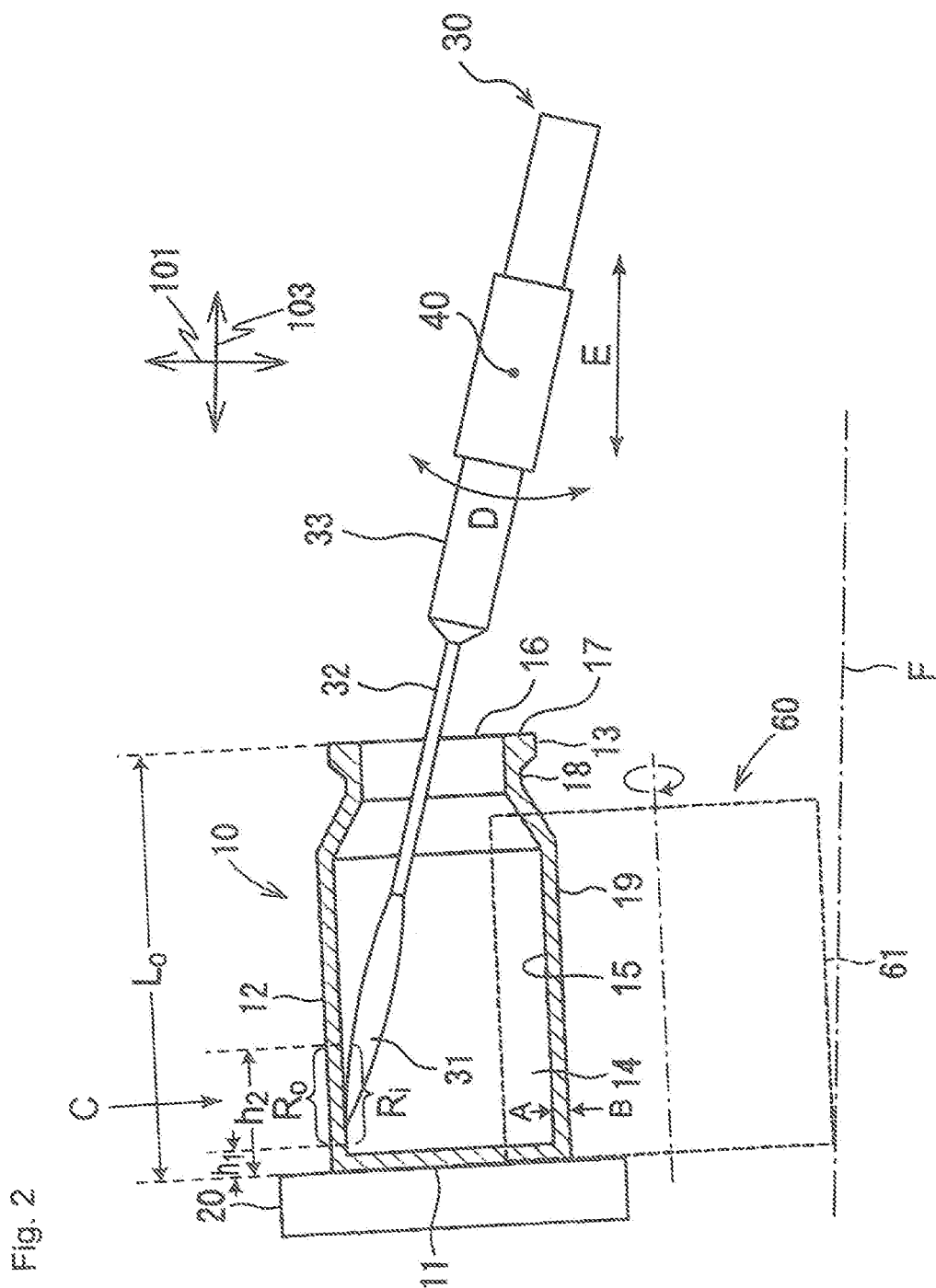
FIG. 2 schematically shows a step of fire-blast treating in the process of producing a glass vessel according to the present invention.

FIG. 2 schematically shows a state of fire-blast treating a preform 10 using a burner 30 in the production of the glass vessel according to the present invention in which a side surface of the vial is located in front of the FIG. 2. The shown preform 10 will be a glass vessel, for example a vial, especially a medical vial by the fire-blast treating. The preform 10 is schematically shown in its cross sectional view.

The preform 10 is a generally circular cylindrical vessel of which bottom is closed, and it has, from its left hand side, a bottom portion 11, a side surface portion 12, a neck portion 18 and a mouth portion 13. The preform 10 has an internal space 14, which opens at the end 17 of the mouth portion 13. The bottom portion 11 is a flat circular disc form, and the bottom portion 11 is integrated with the side surface portion 12 around the periphery of the bottom portion 11. The side surface portion 12 is in a cylindrical form, and has an internal diameter and an external diameter which are substantially uniform along its axis direction. The side surface portion 12 constricts and tapers toward the neck portion 18. In the shown embodiment, the internal diameter and the external diameter of the neck portion 18 are made smaller than those of the side surface portion 12. The mouth portion 13 is connected to the neck portion 18, and has an opening 16 which is defined by the end 17. The internal diameter and the external diameter of the neck portion 13 are made smaller than those of the side surface portion 12. The external diameter of the mouth portion 13 is made larger than the smallest external diameter of the neck portion 18, so that the external diameter of the side surface portion 12 is the largest as to the vial 10. That is, the external periphery of the side surface portion 12 is the maximum diameter of the vial 10. Such preform can be prepared by the conventional process.

As to the above described preform, the bottom portion 11 and the mouth portion 13 of the preform 10 are formed for example by heating, with a flame from a burner, a glass tube which is supported and rotated using a vertical forming machine followed by softening and deforming a portion of the glass tube. When the bottom portion 11 is formed, alkali components such as an alkali borate are volatilized from borosilicate glass which is a raw material of the glass tube and deposits on the internal surface of the preform to form the deteriorated region caused by processing. The volatilized alkali components such as an alkali borate deposits on the vicinity of the bottom portion 11 of the internal surface 15 of the vial 10 to form the deteriorated region caused by processing.

As described above, it has been found that a considerable ratio of the deteriorated region caused by processing is present in the belt like region located between 8% and 16% in height of the total length of the preform 10 from its bottom portion 11, a more ratio of the deteriorated region caused by processing is present between 6% and 20% in height of the total length of the preform, and in addition most of the deteriorated region caused by processing is present between 5% and 30% in height of the total length of the preform. For the purpose of readily understanding, the total length $L_0$, the height $h_1$ as an example of 5% of the total length from the bottom portion ($h_1=L_0*0.05$) and the height $h_2$ as an example of 30% of the total length from the bottom portion ($h_2=L_0*0.30$) are schematically shown in FIG. 2. As a result, most of the deteriorated region caused by processing is present in the belt like region of the internal surface portion Ri located between height $h_2$ and height $h_1$ from the bottom. By fire-blast treating while applying the flame of the burner to such specific region in the form of the belt like region, the amount of the alkali elution from the obtained glass vessel can be greatly reduced.

Also, in one embodiment of the present invention, the fire-blast treating is carried out by scanning the flame over the internal surface of the preform toward the opening of the preform (that is, toward the right hand side in FIG. 2) such that the temperature of the external surface portion (for example the region Ro in the shown embodiment) which is opposed to the internal surface portion (for example the region Ri in the shown embodiment) on which the deteriorated region caused by processing is for example between 650° C. and 800° C. As readily seen, the thickness portion of the side surface portion 12 of the preform, that is, the portion of the preform which is shown with hatching is defined by the internal surface 15 and the external surface 19, which are opposed to each other through the thickness portion. Similarly, the external surface portion Ro is opposed just to the internal surface portion Ri through the thickness portion. In the process of the present invention, the external surface portion of the preform of which temperature is to be measured is the external surface portion shown with the arrow B which is opposed just to the internal surface portion on which the deteriorated region caused by processing, for example the internal surface portion shown with the arrow A through the thickness portion, and the conditions of the fire-blast treating are adjusted such that such portion shown with the arrow B is for example between 650° C. and 800° C.

It is noted that the portion shown with the arrow B may be substantially a point. When the portion shown with the arrow is substantially a point, the external surface portion of which temperature is to be measured becomes a circular periphery including such point since the fire-blast treating is carried out while the preform is rotated around its axis. In this case, measuring a temperature of a point B at a certain height from the bottom results in the temperature measurement on a circle at said height of the external surface of the preform.

In other embodiment, the portion shown with the arrow B is a line. When the portion shown with the arrow is substantially a line extending over a certain length along the axis of the preform, the external surface portion of which temperature is to be measured becomes a belt like region (which has a circular cross section and which is closed) including such line since the fire-blast treating is carried out while the preform is rotated around its axis. Since it has been found that a large ratio of the deteriorated region caused by processing is present on the belt like region of the internal surface of the side surface portion of the preform, especially on the belt like region located over a certain specific height range from the bottom as described above, the external surface portion of which temperature is to be measured is particularly preferably the external surface portion which is opposed to such belt like region. It is of course that the temperature measurement may be carried out over the belt like region on a surface basis.

In the process of the present invention, it is particularly preferable that the temperature measurement is preferably carried out with a noncontact temperature measuring device for example a radiation type thermometer. The radiation type thermometer may be one which can measure a temperature of a spot area or one which can measure a temperature of a larger area. Since it is preferable that the temperature is measured over the belt like region as described above, a so-called thermography type thermometer can be used. In other words, the present invention provides a using method of a thermography type thermometer in which the thermography type thermometer is used for the measurement of the external surface portion of the preform upon the fire-blast treating the preform. In this process, the specific region of the external surface portion to be measured (for example, the belt like region located at a height of 8% to 16% of the total length of the preform from its bottom), the temperature in said region which temperature is to be within the specific temperature range (for example between 650° C. and 800° C.) and so on are substantially the same as those in the production process of the glass vial according to the present invention.

More particularly, it is preferable to carry out the temperature measurement at one time over the whole width of the belt like region of the external surface portion (for example, the area of $h_2$-$h_1$ in FIG. 2, that is the area of Ro) which is opposed to the internal surface portion where the deteriorated region caused by processing is present. For example, the temperature measuring device C is placed over the preform 10 as shown in FIG. 2 with the arrow C, and measures the temperature of the predetermined portion of the external surface portion of the preform 10.

The above described temperature measurement is carried out during the fire-blast treating. When the measured temperature is within the predetermined range, it is seen that the fire-blast treating is proceeding as predetermined. That is, it is presumed that the alkali elution of the glass vessel which is obtained after the fire-blast treating would be within the predetermined range. On the other hand, when the measured temperature is outside the predetermined range, it is possible that the fire-blast treating is not proceeding sufficiently, so that the produced glass vessel is regarded as a defective product.

The judgment whether the results of the temperature measurement is within the predetermined range may be carried out during the fire-blast treating or after completing the fire-blast treating. In the former case, the judgment is carried out online, and when the results shows outside the predetermined temperature range, the glass vessel which has been just produced at that time is taken away immediately as a defective product. In the latter case, the judgment is carried out offline, and the time of the fire-blast treating and the produced glass vessel at that time are correlated, so that the time when the results has been outside the predetermined temperature range is found out, and the glass vessel which has been produced at that time is taken away afterward as a defective product.

FIGS. 3A and 3B schematically show a mechanism which axially rotates a preform 10 upon the fire-blast treating in the process according to the present invention. FIG. 3A is substantially the same as the state of the preform 10 which is shown in the left hand side of FIG. 2. FIG. 3B schematically shows a state when seeing the preform 10 in FIG. 3A from its right hand side. It is noted that the temperature measuring device 110 is schematically shown in FIG. 3A and FIG. 3B. The shown embodiment schematically shows a state wherein the temperature measuring device 110 such as a thermography measures a temperature of a portion of the external surface (corresponding to the above described Ro) which is surrounded by predetermined length portions along a generatices of the preform and short length portions along circumferential directions of the preform. It is noted that the temperature measuring range is schematically shown with the broken lines.

The preform 10 is placed on peripheries of a roller pair 60. The rollers are provided in parallel along the lateral direction 102 with their axes inclined a little with respect to the horizontal direction (the longitudinal direction 103) (see the dot-and-dash line F in FIG. 1). As a result of such incline, the axis direction of the preform 10 supported by peripheral surfaces of the first roller 61 and the second roller 62 inclines a little with regard to the horizontal line (the longitudinal direction 103). As a result, the vial 10 opens upwardly a little as to the horizontal line. The side surface portion 12 of the preform 10 are in contact with the external peripheral surfaces of the first roller 61 and the second roller 62. The preform 10 therefore axially rotates while stably keeping abutting condition of the preform 10 to a contact member 20 which is placed with inclined a little as to the vertical direction 101.

For details, a whole of the side surface portion 12 which is a circumferential surface having a maximum diameter of the vial 10 rotates with abutting to each of a circumferential surfaces of the first roller 61 and the second roller 62. As shown in FIG. 3B, the vial 10, the first roller 61 and the second roller 62 rotate while one point along the circumferential of the side surface portion 12 (actually a generatrix of the side surface portion) of the vial 10 contacts with one point along the circumferential of the roller 61 (actually a generatrix of the side surface portion of the roller), and other one point along the circumferential of the side surface portion 12 (actually a generatrix of the side surface portion) of the vial 10 contacts with one point along the circumferential of the roller 62 (actually a generatrix of the side surface portion of the roller). For example, when each roller is rotated clockwise as shown with the arrows, the preform 10 is axially rotated counterclockwise.

The shown rollers are preferably made of a material which has a good thermal conductivity, so that heat applied to the preform by the fire-blast treating is dissipated. As a result, the temperature of the external surface the preform can be kept within the above described predetermined range in combination with the fire-blast treating conditions. Graphite, an aluminum alloy, brass and the like are exemplified as the preferable material used for the rollers.

The burner which is used in the process according to the present invention is preferably a so-called point burner 30. As shown in FIG. 2, the burner 30 is placed such that it is opposed to the contact member 20. The point burner 30 has a burner body 33 and a nozzle 32. A diameter (internal diameter) of the nozzle is preferably 1.0 mm to 1.5 mm.

The burner body 33 is of a generally cylindrical form, and it includes flow paths through which a combustible gas such as a liquefied natural gas and oxygen pass respectively. Those paths join together so as to form a mixture gas. The burner also has a path therein through which the mixture gas passes. The burner body 33 is connected at its proximal end to a flow rate control device (not shown) for the combustible gas and oxygen. Any publicly known flow rate control device can be used.

The nozzle 32 is connected to the distal end of the burner body 33. The nozzle 32 is of a straw form through which the mixture gas ejected from the burner body 33 passes. The outer diameter of the nozzle 32 as its thickness is so designed that the nozzle can be inserted into the internal space 14 of the vial 10, and the axial direction of the nozzle 32 can be changed when its leading end is located in the internal space 14 of the vial 10. That is, the outer diameter of the nozzle 32 is sufficiently smaller than the inner diameter of the inner diameter of the neck portion 18 of the vial 10. The length of the nozzle 32 along its axis is sufficiently longer than that of the vial 10 along its axis. As the nozzle 32, a material having a good heat resistance such as ceramics is preferable.

The mixture gas is ejected outside from the leading end of the nozzle 32 as a leading end of the point burner 30 through the inner space of the nozzle 32 from the inner space of the burner body 33. By igniting the mixture gas ejected outside from the leading end of the nozzle 32, a flame is ejected from the leading end of the point burner 30. The heating power of the flame 31 can be controlled by changing the flow rates of the combustible gas and oxygen respectively by the flow rate control devices.

The point burner is rotatable for example around an axis 40 as shown with a two-direction arrow D, and also movable horizontally as shown with a two-direction arrow E, so that it can approach to the preform 10 or get away from the preform 10. By combining two kinds of such movements, it is possible that the end of the flame contacts with the specific region of the internal surface of the preform.

It is noted that the internal surface portion to be fire-blast treated is defined by the height from the bottom of the preform based on its external dimension as described above. For example, in the case wherein "the deteriorated region caused by processing which corresponds to a belt-like region which is located at a height between 8% and 16% of a total height of the preform from a bottom of the preform" is fire-blast treated, a starting point of the fire-blast treating is a position which is located at a height of 8% of the total length of the preform from its bottom. In the process of the present invention, the burner is placed such that the position of 8% is located on an extended line of the nozzle 32 (its center line for details) which is oriented toward the preform while adjusting operation conditions of the burner, so that the end of the flame ejected from the nozzle of the burner contacts with the position of 8%. In other embodiment, it is also possible that the end of the flame and/or a portion inside and close to the end of the flame contacts with such position. Thereafter, the flame is scanned from the position of 8% to the position of 17% toward the opening, and the fire-blast treating may be finished at the position of 17%. In the process of the present invention, it is considered that when the position of the above described height is present on the extended line of the burner or nozzle at the end of the burner, such position of the internal surface is fire-blast treated.

The features of the above described various temperature ranges of the external surface portion of the preform upon the fire-blast treating, and the features of the above described various positional ranges of the internal surface portion of the preform to be fire-blast treated may be applied in any combination thereof to the process of producing the glass vessel, the process of fire-blast treating, and the process of reducing an amount of the alkali elution from the glass vessel according to the present invention.

The present application claims a priority of Japanese Patent Application No. 2015-89619 base on the Paris Convention, and the description of such Application constitutes the description of the present application with reference to such Application.

REFERENCE SIGNS LIST

10 . . . preform or vial (glass vessel)
11 . . . bottom portion
12 . . . side surface portion
13 . . . mouth portion
15 . . . internal surface
20 . . . contact member
30 . . . point burner
31 . . . flame
32 . . . nozzle
60 . . . roller pair
61 . . . first roller
62 . . . second roller
110 . . . temperature measuring device
h1 . . . length from bottom up to starting position of belt like region where deteriorated region caused by processing is present
h2 . . . length from bottom up to finishing position of belt like region where deteriorated region caused by processing is present
Lo . . . total length of preform
Ri . . . internal surface portion where deteriorated region caused by processing is present
Ro . . . external surface portion of preform which corresponds to internal surface portion Ri

The invention claimed is:

1. A process of producing a glass vessel by fire-blast treating an internal surface of a preform of the glass vessel having a wall thickness between 0.8 mm and 2.0 mm with a flame from a burner so as to produce the glass vessel, wherein the preform of the glass vessel before the fire-blasting treating has a deteriorated region caused by processing on at least a portion of its internal surface, and the fire-blast treating comprises:

measuring, with a radiation type thermometer, a temperature of an outer surface portion of the preform which portion is opposed to the deteriorated region of the preform caused by the processing, and scanning with the flame along the internal surface portion only of the preform toward an opening of the preform, which internal surface portion is in a belt like region located at a height between 5% and 30% of a total height of the preform from a bottom of the preform based on an external dimension of the preform such that the temperature of the outer surface portion of the preform is between 650° C. and 800° C., wherein an amount of alkali elution from the internal surface of the glass vessel measured according to ISO 4802 is reduced compared with an amount of alkali elution from the internal surface of the preform.

2. The process of producing the glass vessel according to claim 1, wherein the internal surface portion of the preform in the belt like region is located at a height between 8% and 16% of a total height of the preform from a bottom of the preform based on an external dimension of the preform.

3. The process of producing the glass vessel according to claim 1, wherein
the preform comprises a borosilicate glass.

4. The process of producing the glass vessel according to claim 1, wherein
the glass vessel is a glass vessel for medical use.

5. The process of producing the glass vessel according to claim 1, wherein
the glass vessel has a wall thickness between 0.9 mm and 1.5 mm.

6. The process of producing the glass vessel according to claim 1, wherein
the glass vessel has a wall thickness between 1.0 mm and 1.2 mm.

7. The process of producing the glass vessel according to claim 1, wherein the radiation type thermometer is a thermography type thermometer.

* * * * *